(12) United States Patent
Venkatesan et al.

(10) Patent No.: US 7,136,535 B2
(45) Date of Patent: *Nov. 14, 2006

(54) CONTENT RECOGNIZER VIA PROBABILISTIC MIRROR DISTRIBUTION

(75) Inventors: Ramarathnam Venkatesan, Redmond, WA (US); Mark C. Johnson, Oakland, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/275,216

(22) Filed: Dec. 19, 2005

(65) Prior Publication Data

US 2006/0110006 A1    May 25, 2006

Related U.S. Application Data

(63) Continuation of application No. 10/186,459, filed on Jun. 28, 2002, now Pat. No. 7,006,703.

(51) Int. Cl.
*G06K 9/36* (2006.01)
*G06K 9/38* (2006.01)

(52) U.S. Cl. ............... 382/252; 382/171; 382/173; 382/250; 375/240; 375/240.03

(58) Field of Classification Search ........... 382/252, 382/171–173, 176, 180, 190, 220, 229, 240, 382/250, 251, 253, 300; 358/465, 466; 375/240, 375/243, 240.25, 240.26, 240.03
See application file for complete search history.

(56) References Cited

U.S. PATENT DOCUMENTS

| 4,773,039 A | 9/1988 | Zamora |
| 5,210,820 A | 5/1993 | Kenyon |
| 5,351,310 A | 9/1994 | Califano et al. |
| 5,425,081 A | 6/1995 | Gordon et al. |
| 5,465,353 A | 11/1995 | Hull et al. |
| 5,535,020 A | 7/1996 | Ulichney |
| 5,613,004 A | 3/1997 | Cooperman et al. |
| 5,664,016 A | 9/1997 | Preneel et al. |
| 5,687,236 A | 11/1997 | Moskowitz et al. |
| 5,689,639 A | 11/1997 | Schwarz |
| 5,774,588 A | 6/1998 | Li |
| 5,802,518 A | 9/1998 | Karaev et al. |

(Continued)

FOREIGN PATENT DOCUMENTS

EP    0581317    2/1994

(Continued)

OTHER PUBLICATIONS

Mihcak et al. "Watermarking via Optimization Algorithms for Quantizing Randomized Statistics of Image Regions" Proceedings of the Annual Allerton Conference on Communication Control and Computing Urbana IL 2002 10 pages.

(Continued)

*Primary Examiner*—Jingge Wu
*Assistant Examiner*—Ali Bayat
(74) *Attorney, Agent, or Firm*—Lee & Hayes, PLLC

(57) ABSTRACT

An implementation of a technology, described herein, for facilitating the recognition of content of digital goods. At least one implementation, described herein, derives a probabilistic mirror distribution of a digital good (e.g., digital image or audio signal). It uses the resulting data to derive weighting factors (i.e., coefficients) for the digital good. Based, at least in part on such weighting factors, it determines statistics of the good and quantizes it. The scope of the present invention is pointed out in the appending claims.

11 Claims, 5 Drawing Sheets

U.S. PATENT DOCUMENTS

| | | | |
|---|---|---|---|
| 5,809,498 | A | 9/1998 | Lopresti et al. |
| 5,875,264 | A | 2/1999 | Carlstrom |
| 5,899,999 | A | 5/1999 | De Bonet |
| 5,915,038 | A | 6/1999 | Abdel-Mottaleb et al. |
| 5,918,223 | A | 6/1999 | Blum et al. |
| 5,953,451 | A | 9/1999 | Syeda-Mahmood |
| 6,081,893 | A | 6/2000 | Grawrock et al. |
| 6,101,602 | A | 8/2000 | Fridrich |
| 6,314,192 | B1 | 11/2001 | Chen et al. |
| 6,321,232 | B1 | 11/2001 | Syeda-Mahmood |
| 6,363,381 | B1 | 3/2002 | Lee et al. |
| 6,363,463 | B1 | 3/2002 | Mattison |
| 6,370,272 | B1 | 4/2002 | Shimizu |
| 6,377,965 | B1 | 4/2002 | Hachamovitch et al. |
| 6,401,084 | B1 | 6/2002 | Ortega et al. |
| 6,418,430 | B1 | 7/2002 | DeFazio et al. |
| 6,477,276 | B1 | 11/2002 | Inoue et al. |
| 6,513,118 | B1 | 1/2003 | Iwamura |
| 6,522,767 | B1 | 2/2003 | Moskowitz et al. |
| 6,532,541 | B1 | 3/2003 | Chang et al. |
| 6,546,114 | B1 | 4/2003 | Venkatesan et al. |
| 6,574,348 | B1 | 6/2003 | Venkatesan et al. |
| 6,584,465 | B1 | 6/2003 | Zhu et al. |
| 6,625,295 | B1 | 9/2003 | Wolfgang et al. |
| 6,647,128 | B1 | 11/2003 | Rhoads |
| 6,658,423 | B1 | 12/2003 | Pugh et al. |
| 6,658,626 | B1 | 12/2003 | Aiken |
| 6,671,407 | B1 | 12/2003 | Venkatesan et al. |
| 6,674,861 | B1 | 1/2004 | Xu et al. |
| 6,687,416 | B1 | 2/2004 | Wang |
| 6,700,989 | B1 | 3/2004 | Itoh et al. |
| 6,701,014 | B1 | 3/2004 | Syeda-Mahmood |
| 6,751,343 | B1 | 6/2004 | Ferrell et al. |
| 6,754,675 | B1 | 6/2004 | Abdel-Mottaleb et al. |
| 6,768,809 | B1 | 7/2004 | Rhoads et al. |
| 6,771,268 | B1* | 8/2004 | Crinon ................. 345/475 |
| 6,782,361 | B1 | 8/2004 | El-Maleh et al. |
| 6,799,158 | B1 | 9/2004 | Fischer et al. |
| 6,839,673 | B1 | 1/2005 | Choi et al. |
| 6,990,444 | B1 | 1/2006 | Hind et al. |
| 6,990,453 | B1 | 1/2006 | Wang et al. |
| 2002/0126872 | A1 | 9/2002 | Brunk et al. |
| 2003/0118208 | A1* | 6/2003 | Epstein ................. 382/100 |
| 2003/0169269 | A1* | 9/2003 | Sasaki et al. ............ 345/581 |
| 2005/0180500 | A1* | 8/2005 | Chiang et al. ........... 375/240 |

FOREIGN PATENT DOCUMENTS

| | | |
|---|---|---|
| EP | 1 253 784 | 10/2002 |
| JP | 2000149004 | 5/2000 |
| JP | 2000261655 | 9/2000 |
| JP | 2000332988 | 11/2000 |
| WO | WO 99/17537 | 4/1999 |
| WO | WO 99/18723 | 4/1999 |
| WO | WO 99/60514 | 11/1999 |
| WO | WO 01/11890 | 2/2001 |
| WO | WO 01/28230 | 4/2001 |
| WO | WO 02/37331 | 5/2002 |

OTHER PUBLICATIONS

Moulin et al. "The Parallel-Gaussian Watermarking Game" IEEE Transactions Information Theory Feb. 2004 pp. 1-36.

Venkatesan et al. "Robust Image Hashing" Proceedings of the IEEE-ICIP Vancouver BC Canada 2000 3 pages.

Chang et al. RIME: A Replicated Image Detector for the World-Wide Web Proceedings of the SPIE vol. 3527 Nov. 2-4, 1998 pp. 58-67.

"Quantization Index Modulation Methods for Digital Watermarking and Information Embedding of Multimedia" Journal of VLSI Signal Processing 27 2001 pp. 7-33.

Mihcak et al. "New Iterative Geometric Methods for Robust Perceptual Image Hashing" Proceedings of the Security and Privacy Digital Rights Management Workshop 2001 9 pages.

"Iteratively Decodable Codes for Watermarking Applications" Proceedings of the Second Symposium on Turbo Codes and Their Applications France Sep. 2000 4 pages.

Venkatesan et al. "Image Watermarking with Better Resilience" Proceedings of IEEE-ICIP Vancouver BC Canada 2000 4 pages.

Mihcak et al. "Cryptanalysis of Discrete-Sequence Spread Spectrum Watermarks" Proceedings of the Information Hiding Workshop Holland 2002 21 pages.

Mihcak et al. "Blind Image Watermarking Via Derivation and Quantization of Robust Semi-Global Statistics" Proceedings of IEEE-ICASSP Orlando FL 2002 4 pages.

"Achievable Performance of Digital Watermarking Systems" IEEE 1999 pp. 13-18.

Mihcak et al. "A Perceptual Audio Hashing Algorithm: A Tool For Robust Audio Identification and Information Hiding" Proceedings of the Information Hiding Workshop 2001 15 pages.

Malvar, "A Modulated Complex Lapped Transform and its Applications to Audio Processing" IEEE ICASSP'99 Phoenix AZ. Mar. 1999 pp. 1-4.

Moulin et al. "A Framework for Evaluating the Data-Hiding Capacity of Image Sources" IEEE Transactions on Image Processing vol. 11 No. 9 Sep. 2002 pp. 1-14.

Wu et al. Video Access Control Via Multi-level Data Hiding Proc. IEEE Int. Conf. on Multimedia and Expo vol. 1 Jul./Aug. 2000 pp. 381-384.

Lin et al., "A Robust Image Authentication Method Distinguishing JPEG Compression from Malicious Manipulation", IEEE Transactions, Feb. 2001, vol. 11, No. 2, pp. 153-168.

M. D. Swanson, B. Zhu and B. Chau, "Object based transparent video watermarking," Proceedings of IEEE Signal Processing Society 1997 Workshop on Multimedia Signal Processing, Jun. 23-25, 1997, Princeton, New Jersey, USA.

M. K. Mihcak and R. Venkatesan, "A tool for robust audio information hiding: A perceptual audio hashing algorithm," submitted to Workshop on Information Hiding, Pittsburgh, PA, 2001.

T. Kalker and J. Haitsma, "Efficient detection of a spatial spread-spectrum watermark in MPEG video streams," Proc. IEEE ICIP, Vancouver, Canada, Sep. 2000.

F. A. P. Petitcolas and R. J. Anderson, "Evaluation of copyright marking systems," Proceedings of IEEE Multimedia Systems'99, vol. 1, pp. 574-579, Jun. 7-11, 1999, Florence, Italy.

Schneider et al., "A Robust Content Based Digital Signature for Image Authentication", Proceedings, International Conference, Sep. 1996, vol. 3, pp. 227-230.

I. J. Cox, J. Killian, T. Leighton, and T. Shamoon, "A secure robust watermark for multimedia," Information Hiding Workshop, University of Cambridge, pp. 185-206, 1996.

J. Dittman, M. Stabenau and R. Steinmetz, "Robust MPEG video watermarking technologies," Proceedings of ACM Multimedia '98, The 6th ACM International Multimedia Conference, Bristol, England, pp. 71-80.

B. Chen and G. W. Wornell, "Digital watermarking and Information embedding using dither modulation," Proc. IEEE Workshop on Multimedia Signal Processing, Redondo Beach, CA, pp. 273-278, Dec. 1998.

Fridrich, "Robust Hash Functions for Digital Watermarking" Proc. Int. Conf. on Information Technology: Coding and Computing Mar. 2000 pp. 178-183.

Lee et al. "Adaptive Video Watermarking Using Motion Information" Proc SPIE vol. 3971: Security and Watermarking of Multimedia Contents II Jan. 2000 pp. 209-216.

"General Quality Maintenance Module for Motion Picture Watermarking" IEEE Trans. on Consumer Electronics vol. 45 No. 4. Nov. 1999 pp. 1150-1158.

Politis et al., "An Audio Signatures Indexing Scheme for Dynamic Content Multimedia Databases", Electrotechnical Conference, 2000. IEEE, vol. 2, May 29, 2000, pp. 725-728.

Chang et al., "A Spatial Match Representation Scheme for Indexing and Querying in Iconic Image Databases", 1997, ACM, Retrieved from the Internet http://portal.acm.org/citation.cfm?Id=266890&coll=ACM&dl=ACM&CFID=68519948&CFTOKEN=85922645.

El-Kwae et al., "Efficient Content-Based Indexing of Large Image Databases", Apr. 2000, ACM, Retrieved from the Internet: http://portal.acm.org/citation.cfm?id=348762&coll=ACM&dl=ACM&CFID=68519948&CFTOKEN=85922645.

Lambrou et al, "Classification of Audio Signals Using Statistical Features on Time and Wavelet Transform Domains", Accoustics, Speech and Signal Processing, 1998. Proceedings of the 1998 IEEE International Conference on Seattle, WA, USA May 12-15, 1998, New York, NY, USA, IEEE, US, vol. 6, pp. 3621-3624.

Moreno et al., "Using the Fisher Kernal Method for Web Audio Classification", Acoustics, Speech, and Signal Processing, 2000. ICASSP '00. Proceedings. 2000 IEEE International Conference on Jun. 5-9, 2000, Piscataway, NJ, USA, IEEE, vol. 6, pp. 2417-2420.

Pye, D., "Content-Based Methods for the Management of Digital Music", Acoustics, Speech, and Signal Processing, 2000. ICASSP '00. Proceedings. 2000 IEEE International Conference on Jun. 5-9, 2000, Piscataway, NJ, USA, IEEE, vol. 6, pp. 2437-2440.

* cited by examiner

CONTENT RECOGNIZER VIA PROBABILISTIC MIRROR DISTRIBUTION

RELATE APPLICATIONS

This application is a continuation of and claims priority to U.S. patent application Ser. No. 10/186,459, filed Jun. 28, 2002 now U.S. Pat. No. 7,006,703, the disclosure of which is incorporated by reference herein.

BACKGROUND

Digital goods are often distributed to consumers over private and public networks—such as Intranets and the Internet. In addition, these goods are distributed to consumers via fixed computer readable media, such as a compact disc (CD-ROM), digital versatile disc (DVD), soft magnetic diskette, or hard magnetic disk (e.g., a preloaded hard drive).

Unfortunately, it is relatively easy for a person to pirate the pristine digital content of a digital good at the expense and harm of the content owners—which includes the content author, publisher, developer, distributor, etc. The content-based industries (e.g., entertainment, music, film, software, etc.) that produce and distribute content are plagued by lost revenues due to digital piracy.

Modern digital pirates effectively rob content owners of their lawful compensation. Unless technology provides a mechanism to protect the rights of content owners, the creative community and culture will be impoverished.

"Digital goods" is a generic label, used herein, for electronically stored or transmitted content. Examples of digital goods include images, audio clips, video, multimedia, software, and data. Depending upon the context, digital goods may also be called a "digital signal," "content signal," "digital bitstream," "media signal," "digital object," "object," and the like.

In addition, digital goods are often stored in massive databases—either structured or unstructured. As these databases grow, the need for streamlined categorization and identification of goods increases.

Hashing

Hashing techniques are used to protect the rights of content owners and to speed database searching/access. Hashing techniques are used in many areas such as database management, querying, cryptography, and many other fields involving large amounts of raw data.

In general, a hashing technique maps a large block of raw data into relatively small and structured set of identifiers. These identifiers are also referred to as "hash values" or simply "hash." By introducing a specific structure and order into raw data, the hashing function drastically reduces the size of the raw data into short identifiers. It simplifies many data management issues and reduces the computational resources needed for accessing large databases.

Limitations of Conventional Hashing

Conventional hashing techniques are used for many kinds of data. These techniques have good characteristics and are well understood. Unfortunately, digital goods with visual and/or audio content present a unique set of challenges not experienced in other digital data. This is primarily due to the unique fact that the content of such goods are subject to perceptual evaluation by human observers. Typically, perceptual evaluation is visual and/or auditory.

For example, assume that the content of two digital goods is, in fact, different, but only perceptually insubstantial so. A human observer may consider the content of two digital goods to be similar. However, even perceptually insubstantially differences in content properties (such as color, pitch, intensity, phase) between two digital goods result in the two goods appearing substantially different in the digital domain.

Thus, when using conventional hashing functions, a slightly shifted version of a digital good generates a very different hash value as compared to that of the original digital good, even though the digital good is essentially identical (i.e., perceptually same) to the human observer.

The human observer is rather tolerant of certain changes in digital goods. For instance, human ears are less sensitive to changes in some ranges of frequency components of an audio signal than other ranges of frequency components.

This human tolerance can be exploited for illegal or unscrupulous purposes. For example, a pirate may use advanced audio processing techniques to remove copyright notices or embedded watermarks from audio signal without perceptually altering the audio quality.

Such malicious changes to the digital good are referred to as "attacks", and result in changes at the data domain. Unfortunately, the human observer is unable to perceive these changes, allowing the pirate to successfully distribute unauthorized copies in an unlawful manner.

Although the human observer is tolerant of such minor (i.e., imperceptible) alterations, the digital observer—in the form of a conventional hashing technique—is not tolerant. Traditional hashing techniques are of little help identifying the common content of an original digital good and a pirated copy of such good because the original and the pirated copy hash to very different hash values. This is true even though both are perceptually identical (i.e., appear to be the same to the human observer).

Applications for Hashing Techniques

There are many and varied applications for hashing techniques. Some include anti-piracy, content categorization, content recognition, watermarking, content-based key generation, and synchronization in audio or video streams Hashing techniques may be used to search for digital goods on the Web suspected of having been pirated. In addition, hashing techniques are used to generate keys based upon the content of a signal. These keys are used instead of or in addition to secret keys. Also, hashing functions may be used to synchronize input signals. Examples of such signals include video or multimedia signals. A hashing technique must be fast if synchronization is performed in real time.

SUMMARY

Described herein is a technology for facilitating the recognition of content of digital goods.

At least one implementation, described herein, derives a probabilistic mirror distribution of a digital good (e.g., digital image or audio signal). It uses the resulting data to derive weighting factors (i.e., coefficients) for the digital good. Based at least in part on such weighting factors, it determines statistics of the good and quantizes it.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explaining the present invention. Furthermore, for ease of understanding, certain method steps are delineated as separate steps; however, these separately delineated steps should not be construed as necessarily order dependent in their performance.

The following description sets forth one or more exemplary implementations of a Content Recognizer via Probabilistic Mirror Distribution that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Content Recognizer via Probabilistic Mirror Distribution may be referred to as an "exemplary recognizer."

Introduction

Figure 5:
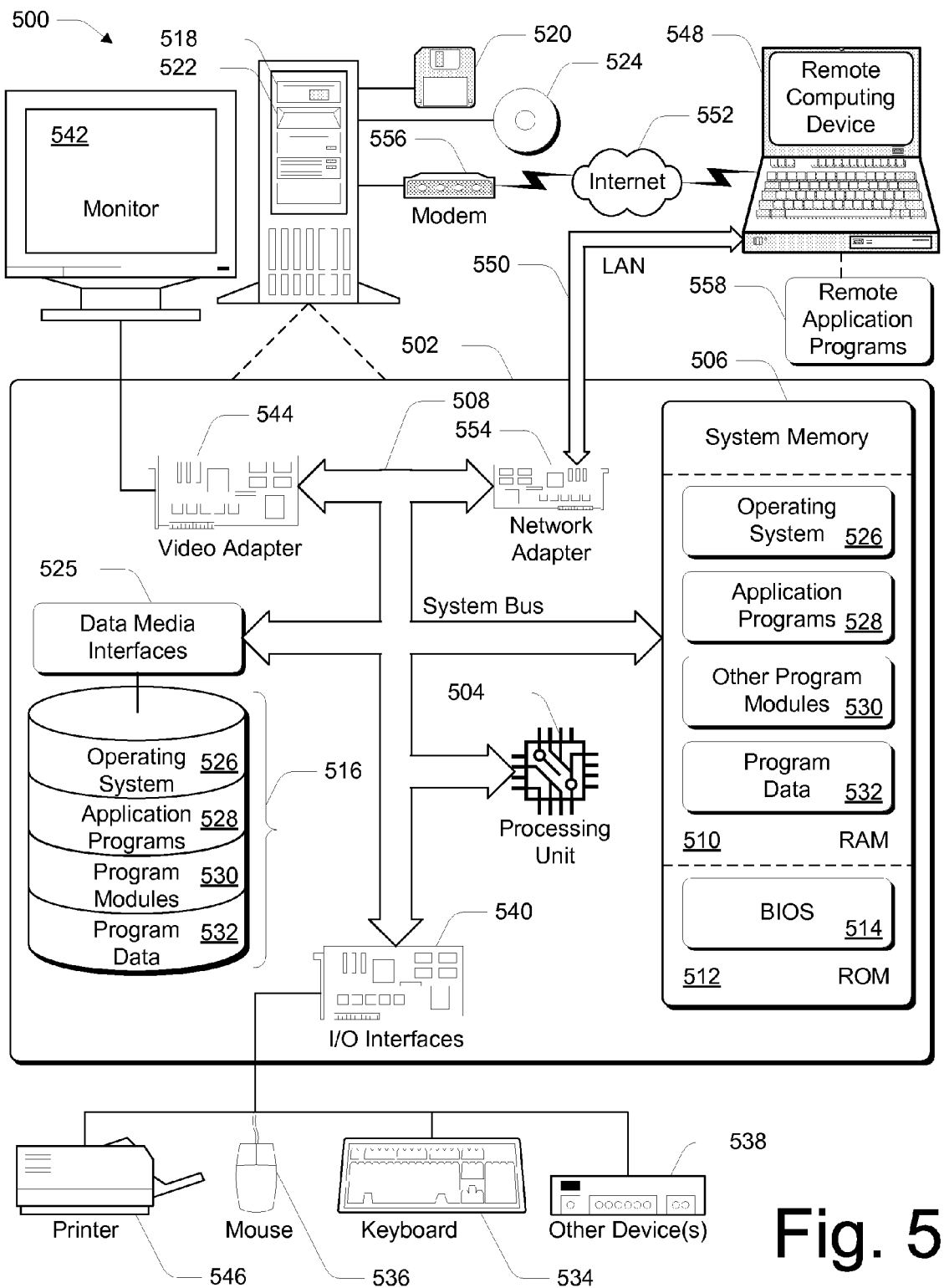
FIG. 5 is an example of a computing operating environment capable of implementing at least one embodiment (wholly or partially) described herein.

The exemplary recognizer may be implemented on computing systems and computer networks like that show in FIG. 5. Although the exemplary recognizer may have many applications, anti-piracy, content recognition, watermarking, content-based key generation, and synchronization of signals are a few examples.

The exemplary recognizer derives a probabilistic mirror distribution of a digital good (e.g., digital image or audio signal). It uses the resulting data to derive weighting factors (i.e., coefficients) for the digital good. Based, at least in part on such weighting factors, it determines statistics of the good and quantizes it. Nearly any sort of quantization technique that has some error correcting properties may be used when decoding the statistics of the good.

Unless the context indicates otherwise, when randomization is mentioned herein, it should be understood that the randomization is typically carried out by a pseudorandom number generator (PRNG). The seed of the PRNG is typically a secret key (K).

Exemplary Recognition System

Figure 1:
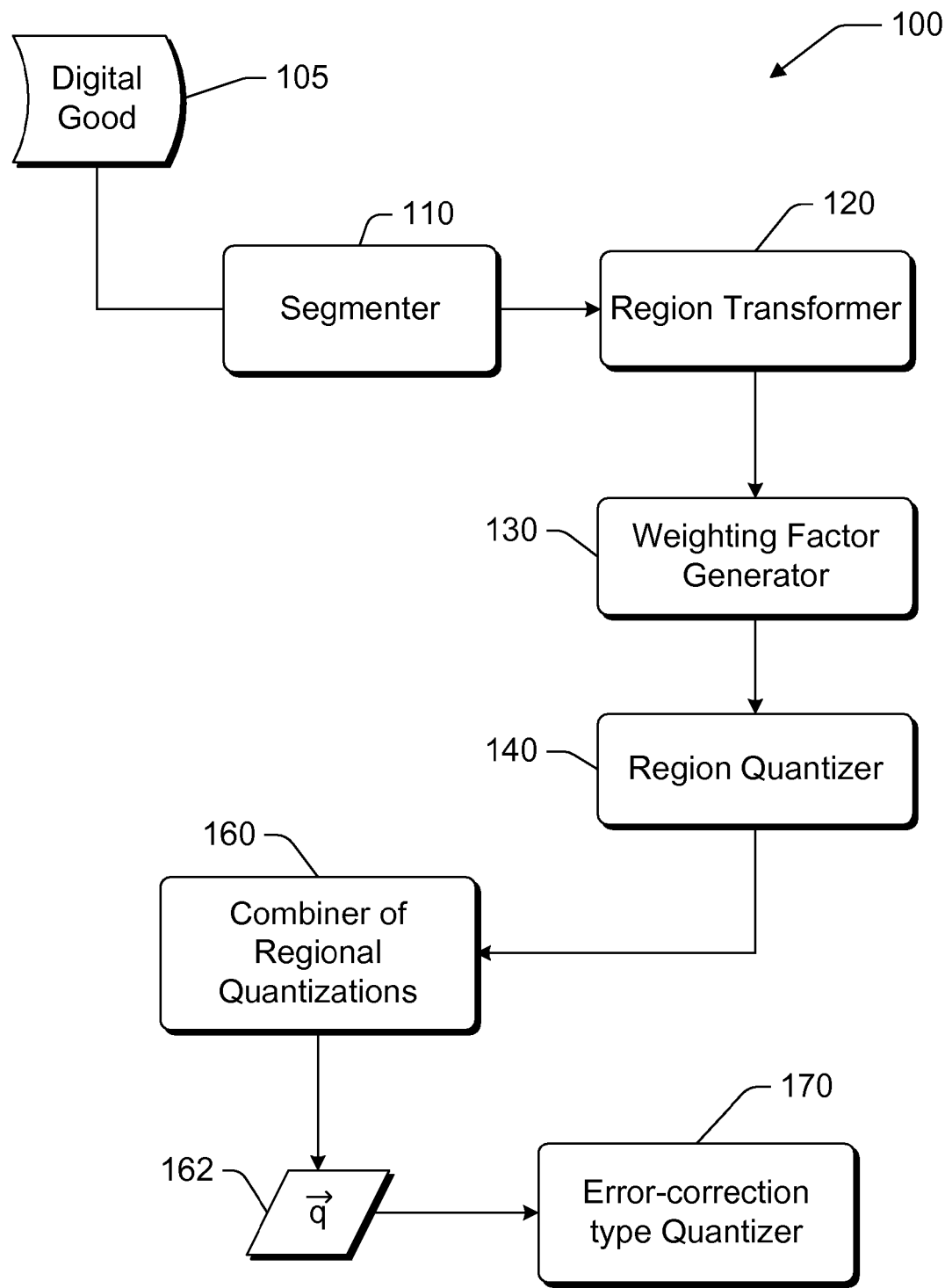
FIG. 1 is system in accordance with an implementation described herein.
Figure 2:
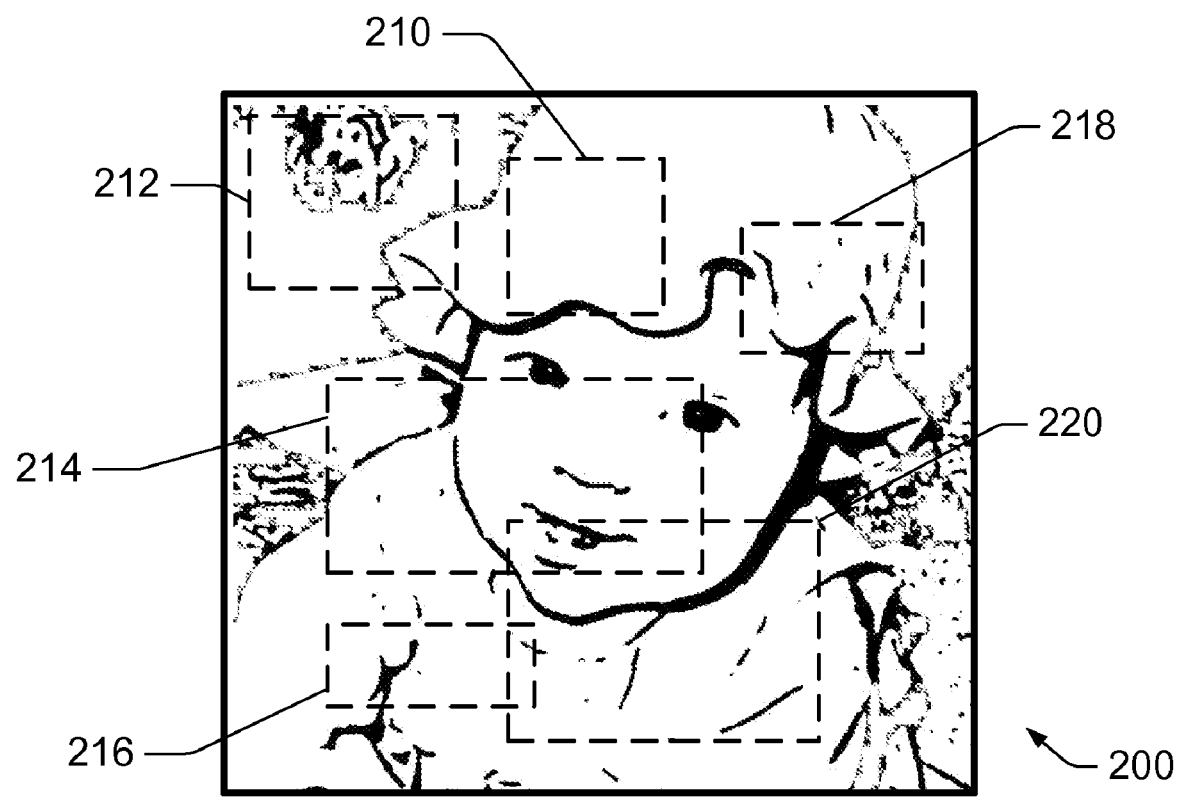
FIG. 2 is a graph illustrating an example digital good (e.g., an image) with multiple regions represented thereon. The multiple regions illustrate an example of segmentation in accordance with a segmentation operation of an implementation described herein.

At least in part, the exemplary recognizer generates an irreversible transform of the digital good. FIG. 1 shows the content recognition system 100, which is an example of an embodiment of the exemplary recognizer.

As shown in FIG. 1, the system 100 includes a segmenter 110, a region transformer 120, a weighting factor generator 130, a region quantizer 140, a combiner of regional quantizations 160, and an error-correction type quantizer 170.

The segmenter 110 obtains a digital good 105 (such as a digital image or an audio clip). It may obtain the good from nearly any source, such as a storage 1 device or over a network communications link. The segmenter 110 separates it into multiple, pseudorandomly sized and distributed regions. These regions may also be called segments or polygons.

The segmenter 110 generates random polygons, $R_1$, $R_2$, ... $R_k$, ... $R_N$, on a digital good (such as a digital audio signal or a digital image). The polygons may be rectangles, for example. These polygons may overlap.

If the good is a digital image, the segmenter 110 may separate the image into rectangles, which are pseudorandomly placed and pseudorandomly sized according to some specified distribution. If the signal is an audio clip, the segmenter 110 may separate the clip into rectangles (of two-dimensions of time and frequency, which may obtained by stacking in columns frequency transform of the input signal restricted to some time intervals (which may overlap)), which are pseudorandomly sized and pseudorandomly positioned within the clip.

The implementation decisions for audio and video signal regarding the sizes and shapes of the regions or rectangles will be usually different. For example, with audio, the regions may be thinner and longer than video, reflecting the characteristics of the correlations that are present in the signal.

Segmenter 110 does not necessarily separate the regions from the good or from each other. It does not necessarily remove the segments from the good. Instead, it defines regions or portions of the good.

The region transformer 120 obtains the regions, $R_1$, $R_2$, ... $R_k$, $R_N$, of the digital good 105 from the segmenter 110. The center of each region (R) is labeled $x_{ij}$. Thus the value of $x_{ij}$ is in the time domain or in some suitable frequency domain. For each region, the region transformer 120 computes suitable statistics Statistics for each region are calculated. These statistics may be, for example, median or any finite order moments of a region. Examples of such include the mean, and the standard deviation.

A suitable statistic for such calculation is the mean (e.g., average) of the values of the individual bits of the region. Other suitable statistics and their robustness are discussed in Venkatesan, Koon, Jakubowski, and Moulin, "Robust image hashing," *Proc. IEEE ICIP* 2000, Vancouver, Canada, September 2000. In this document, no information embedding was considered, but similar statistics were discussed.

After calculating the statistics, the region transformer 120 applies a multi-level (e.g., 2, 3, 4) quantization (i.e., highdimensional, vector-dimensional, or lattice-dimensional quantization) on the calculated statistics of each region to obtain quantized data. Of course, other levels of quantization may be employed. The quantization may be adaptive or non-adaptive.

This quantization may be done pseudorandomly also. This may be called randomized quantization (or randomized rounding). This means that the quantizer may randomly decide to round up or round down. It may do it pseudorandomly (using the secret key).

The weighting-factor generator 130 computes the weighting factor $m_{ij}$ for each region. As part of the computation, the generator 130 utilizes a normal distribution to add to the robustness of the weighting factor. See formula (1.3) below.

The region quantizer 140 quantizes each region, $R_1$, $R_2, \ldots R_k, R_N$, of the digital good 105. For each region, the region quantizer 140 quantizes R based upon $x_{ij}$ and $m_{ij}$. See formula (1.1) below for the calculation of $q_R$ for each region.

Additional details on the operation of the region transformer 120, weighting-factor generator 130, and region quantizer 140 are provided below in the methodological implementation description.

The combiner 160 of regional quantizations ($q_R$) 162 forms a vector $\vec{q}$ by combining $q_R$ of each region R. See formula (1.2) below. This vector $\vec{q}$ may also be called a "recognition" vector (or value, indicator, etc.).

Alternatively, the error-correction type quanitizer 170 may perform additional error-correction type quantization on the regional quantizations ($q_R$) 162. The resulting quantized values may be called a "recognition" vector. It may also be viewed as a hash value.

The "recognition" vector is an inherent and unique indication of the digital good. Assuming that a digital good remains perceptually similar, its recognition value should remain the same after processing. Such processing may be unintentional (e.g., introduction of noise and shifting due to transmission) or intentional. Such intentional processing may be innocent (e.g., red-eye reductions, compression) or malicious (e.g., impairing a watermark, digital piracy).

This recognition indication may used in many applications. Examples of such include anti-piracy, content categorization, content recognition, watermarking, content-based key generation, and synchronization of video signals.

The operation of aforementioned components of the content recognition system 100 of FIG. 1 is explained in more detail below in the methodological implementation description.

Additional Transformations

Furthermore, an additional transformation may be performed on the good (or on the regions of the good) for the purpose of placing the good (or the regions) into a canonical form.

Either the segmenter 110 or the transformer 120 may put the good or the regions of the good into a canonical form using a set of transformations. Specifically, for image (for example), discrete wavelet transformation (DWT) may be employed since it compactly captures significant signal characteristics via time and frequency localization. Other transformations may be used. For instance, shift-invariant and shape-preserving "complex wavelets" and any overcomplete wavelet representation or wavelet packet are good candidates (particularly for images).

Either the segmenter 110 or the transformer 120 may also find the DC subband of the initial transformation (e.g., subband of the DWT). This DC subband of the transformed signal is passed to the quantizer 130.

Either the segmenter 110 or the transformer 120 may produces a transformed signal. When the subject is an image, an example of a suitable transformation is discrete wavelet transformation (DWT). When the subject is an audio clip, an example of a suitable transformation is MCLT (Modulated Complex Lapped Transform). However, most any other similar transformation may be performed in alternative implementations.

Methodological Implementation of the Exemplary Content Recognizer

Figure 3:
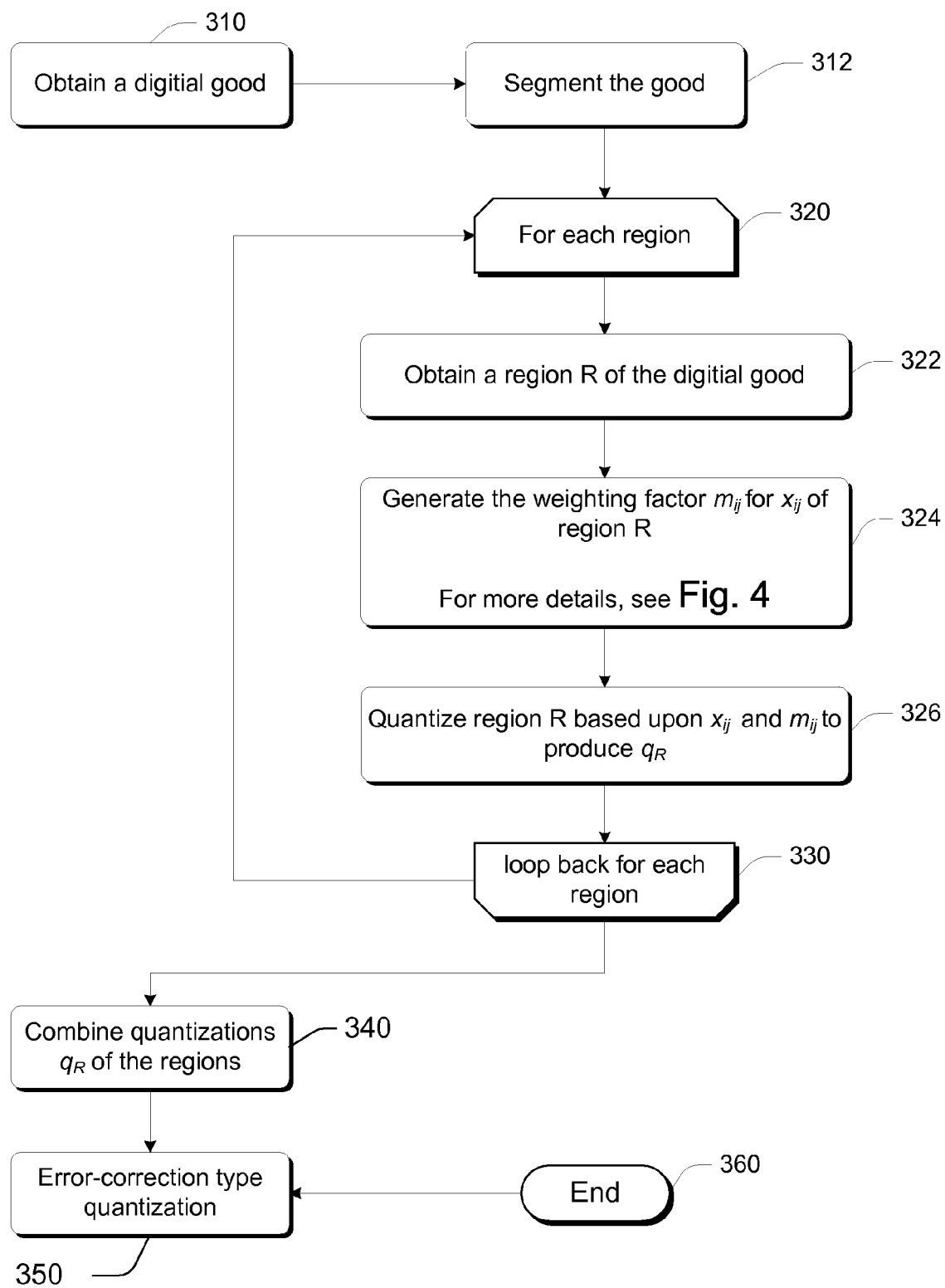
FIG. 3 is a flow diagram showing a methodological implementation described herein.

FIG. 3 shows a methodological implementation of the exemplary recognizer performed by the content recognition system 100 (or some portion thereof). This methodological implementation may be performed in software, hardware, or a combination thereof.

At 310 of FIG. 3, the exemplary recognizer obtains a digital good (such as a digital audio signal or a digital image). At 312, it generates random polygons, $R_1, R_2, \ldots R_k, \ldots R_N$, on the digital good. The polygons may be rectangles, for example. These polygons are randomly placed and randomly sized according to some specified distribution. These polygons may overlap.

Furthermore, at 312, additional transformations may be performed on the good (or on the regions of the good) for the purpose of placing the good (or the regions) into a canonical form.

At 320, a loop begins where blocks 322–326 are repeated for each polygon. In describing this operation of the exemplary recognizer terminology is used:

$R_k$ will be the example $k^{th}$ polygon $R=R_k$ is an array $i^{th}, j^{th}$ entry of R is $x_{ij}$ At 322, the exemplary recognizer obtains a region R.

Figure 4:
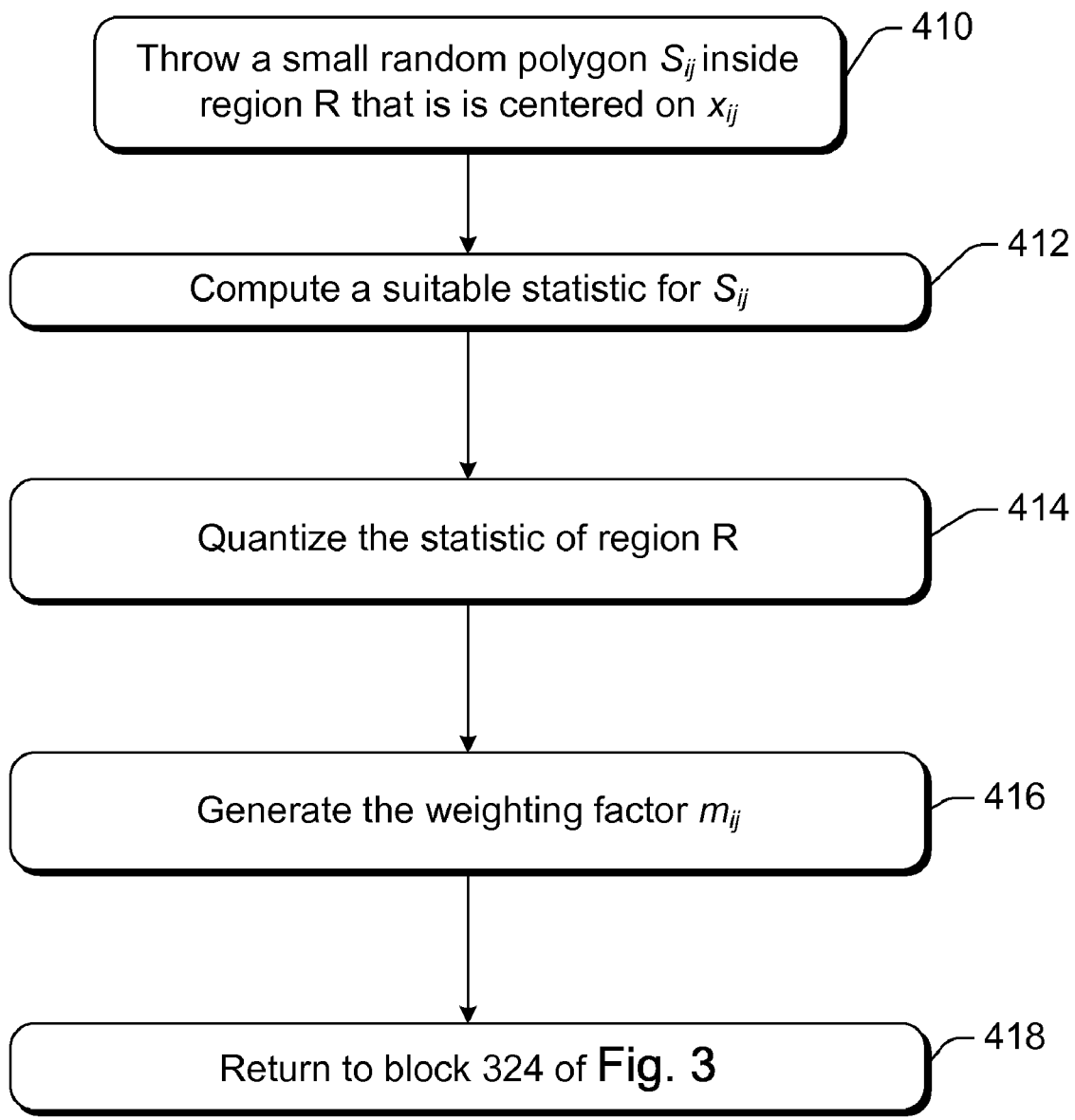
FIG. 4 is a flow diagram showing a methodological implementation described herein.

At 324, it generates the weighting factor $m_{ij}$ for each $x_{ij}$ (i.e., each point of region R). For each $x_{ij}$, the exemplary recognizer performs another aspect of the methodological implementation which is illustrated in FIG. 4. This is described in more detail below.

At 326, the exemplary recognizer quantize R based upon $x_{ij}$ and $m_{ij}$ using the following formula (for example):

$$q_R = \frac{\sum_{ij} m_{ij} x_{ij}}{\sum_{ij} \lambda_{ij} \|x_{ij}\|} \tag{1.1}$$

Here $\lambda_{ij}=1$. However, it could be randomly generated independent of the good. If $\lambda_{ij}=1$, then $q_R$ is resistant to scaling attacks that replace $x_{ij}$ by $\alpha \cdot x_{ij}$. This creates resistance to a number of attacks and $q_R$ is more unguessable than $\Sigma x_{ij}$ without a secret random key.

Alternatively, the calculation of $q_R$ for polygon R may be viewed as hashing a random unknown region M using $x_{ij}$ as weights.

At 330, loop back to block 320 so that blocks 322–326 are repeated for each polygon.

At 340, the exemplary recognizer forms a vector $\vec{q}$ by computing $q_R$ for each region R. It does this after $q_R$ is determined for each polygon.

$$\vec{q} = (q_1, q_2, \ldots, q_N) \tag{1.2}$$

Alternatively, at 350, the exemplary recognizer performs additional error-correction type quantizations on $\vec{q}$. The process ends at 360.

FIG. 4 shows another aspect of the methodological implementation of the exemplary recognizer performed by the content recognition system 100 (or some portion thereof). This methodological implementation may be performed in software, hardware, or a combination thereof.

More specifically, FIG. 4 shows additional methodological implementation details of generation of the weighting factor $m_{ij}$ for each $x_{ij}$ of block 324 of FIG. 3. These blocks are repeated for each point $x_{ij}$ inside region R. Alternatively, it may be performed for a selected subset of the points inside region R.

At 410 of FIG. 4, for each $x_{ij}$, the exemplary recognizer throws small random sub-regions $S_{ij}$ inside region R. Each sub-region $S_{ij}$ is centered on its own $x_{ij}$.

At 412, it computes a suitable statistic (such as average) inside of sub-region $S_{ij}$. Examples of other suitable statistics include LL band-average or HL band variance. For this example, the statistic will be the average, which will be called $\mu_{ij}$.

At 414, the exemplary recognizer quantizes the statistic (e.g., $\mu_{ij}$) of each region R using a random, secret quantizing rules. This may also be called the "coursing" operation or act. This may be represented as follows:

$$\tilde{\mu}_{ij} = \text{quantized}(\mu_{ij})$$

At 416, the exemplary recognizer generates the weighting factor $m_{ij}$ using the following formula (for example):

$$m_{ij} \Leftarrow N(\tilde{\mu}_{ij}, \sigma_{ij}) \qquad (1.3)$$

where N is a normal distribution and $\sigma_{ij}$ is variance. Here one may use other distributions than normal distributions. The values of $\sigma_{ij}$ can be correlated suitably. In addition to the averages $\tilde{\mu}_{ij}$ correlated to the neighboring values. At 418, it returns the generated weighting factor $m_{ij}$ back to block 324 of FIG. 3.

Randomized Irreversible Transform

The weighting factor $m_{ij}$ (see equation (1.3) above) mirrors the digital good in a probabilistic way. In other words, the weighting factor $m_{ij}$ is a distortion of the digital good. This weighting factor $m_{ij}$ is effectively a random variable which is heavily dependent upon the digital good in a small neighborhood (represented by the polygons R) of $x_{ij}$. Still another way of viewing the weighting factor $m_{ij}$ is as a randomized irreversible transform.

Even if an adversary knew the secret key, the adversary cannot determine the weighting factor $m_{ij}$ from $x_{ij}$:

$$R = (x_{ij}) \otimes M = (m_{ij}) \qquad (1.4)$$

The adversary does not know the quantization rules (of the "coursing step") and cannot determine them from $x_{ij}$ (e.g., picture elements of a digital image).

With the exemplary recognizer, an adversary who knows $x_{ij}$ does not know:

the quantization rules for "coursing" step
the value of the weighting factors ($m_{ij}$ for each R).

Exemplary Computing System and Environment

FIG. 5 illustrates an example of a suitable computing environment 500 within which an exemplary recognizer, as described herein, may be implemented (either fully or partially). The computing environment 500 may be utilized in the computer and network architectures described herein.

The exemplary computing environment 500 is only one example of a computing environment and is not intended to suggest any limitation as to the scope of use or functionality of the computer and network architectures. Neither should the computing environment 500 be interpreted as having any dependency or requirement relating to any one or combination of components illustrated in the exemplary computing environment 500.

The exemplary recognizer may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary recognizer may be described in the general context of computer-executable instructions, such as program modules, being executed by a computer. Generally, program modules include routines, programs, objects, components, data structures, etc. that perform particular tasks or implement particular abstract data types. The exemplary recognizer may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing device in the form of a computer 502. The components of computer 502 may include, by are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media may be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 may be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 516, magnetic disk 520, optical disk 524, ROM 512, and/or RAM 510, including by way of example, an operating system 526, one or more application programs 528, other program modules 530, and program data 532.

A user may enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device may also be connected to the system bus 508 via an interface, such as a video adapter 544. In addition to the monitor 542, other output peripheral devices may include components such as speakers (not shown) and a printer 546 which may be connected to computer 502 via the input/output interfaces 540.

Computer 502 may operate in a networked environment using logical connections to one or more remote computers, such as a remote computing device 548. By way of example, the remote computing device 548 may be a personal computer, portable computer, a server, a router, a network computer, a peer device or other common network node, and the like. The remote computing device 548 is illustrated as a portable computer that may include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which may be internal or external to computer 502, may be connected to the system bus 508 via the input/output interfaces 540 or other appropriate mechanisms. It is to be appreciated that the illustrated network connections are exemplary and that other means of establishing communication link(s) between the computers 502 and 548 may be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Computer-Executable Instructions

An implementation of an exemplary recognizer may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 500 in which an exemplary recognizer may be implemented. Specifically, the exemplary recognizer(s) described herein may be implemented (wholly or in part) by any program modules 528–530 and/or operating system 526 in FIG. 5 or a portion thereof.

The operating environment is only an example of a suitable operating environment and is not intended to suggest any limitation as to the scope or use of functionality of the exemplary recognizer(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general-and special-purpose appliances, application-specific integrated circuits (ASICs), network PCs, minicomputers, mainframe computers, distributed computing environments that include any of the above systems or devices, and the like.

Computer Readable Media

An implementation of an exemplary recognizer may be stored on or transmitted across some form of computer readable media. Computer readable media may be any available media that may be accessed by a computer. By way example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, smart card, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    obtaining a digital good;
    segmenting the good into a plurality of regions; and
    producing a recognition indication for the digital good based upon a combination of quantizations $q_R$ for each region of the plurality,
    further comprising, prior to said producing a recognition indication, generating weighting factor mij for one or more points xij of each region of the plurality of regions, wherein the generating comprises:
        defining one or more sub-regions Sij inside of a region R;
        computing suitable statistics for sub-region Sij;
        quantizing the statistics for region R; and
        generating weighting factor mij for one or more points xij of region R.

2. The method of claim 1, further comprising producing a quantization qR of each region of the plurality of regions based upon one or more weighting factors mij of one or more points xij.

3. The method of claim 2, wherein the producing a quantization qR comprises hashing an unknown region M using xij as weights, where region M is based upon the weighting factor mij.

4. The method of claim 1, wherein the segmenting generates multiple, pseudorandomly sized and distributed regions of the plurality.

5. The method of claim 1, wherein one or more of the regions overlap.

6. A method facilitating the recognition of content of digital goods, the method comprising:
    obtaining a digital good;
    segmenting the good into a plurality of pseudorandomly sized and pseudorandomly distributed regions; and
    producing a recognition indication for the digital good, further comprising, prior to said producing a recognition indication, generating weighting factor mij for one or more points xij of each region of the plurality of distributed regions, wherein the generating comprises:
        defining one or more sub-regions Sij inside of a region R;
        computing suitable statistics for sub-region Sij;
        quantizing the statistics for region R; and
        generating weighting factor mij for one or more points xij of region R.

7. The method of claim 6, wherein one or more of the regions overlap.

8. The method of claim 6, wherein the regions are pseudorandomly sized and pseudorandomly distributed according to a specified distribution.

9. The method of claim 6 wherein the segmenting further comprises performing transformations on the good or one or more regions of the good to place the good or one or more regions of the good into a canonical form.

10. The method of claim 9, wherein performing transformations comprises employing discrete wavelet transformation (DWT).

11. The method of claim 6, further comprising producing a quantization qR of each region of the plurality of regions based upon one or more weighting factors mij of one or more points xij.

* * * * *